(12) United States Patent
Fu

(10) Patent No.: US 9,004,113 B2
(45) Date of Patent: Apr. 14, 2015

(54) PIPE HAVING VARIABLE CROSS SECTION

(76) Inventor: Liming Fu, Wuhan (CN)

( * ) Notice: Subject to any disclaimer, the term of this patent is extended or adjusted under 35 U.S.C. 154(b) by 471 days.

(21) Appl. No.: 13/544,968

(22) Filed: Jul. 9, 2012

(65) Prior Publication Data

US 2012/0273169 A1    Nov. 1, 2012

Related U.S. Application Data

(63) Continuation-in-part of application No. PCT/CN2010/080490, filed on Dec. 30, 2010.

(51) Int. Cl.
| | |
|---|---|
| *F16L 9/18* | (2006.01) |
| *F28D 15/04* | (2006.01) |
| *F16L 59/07* | (2006.01) |
| *F16L 59/14* | (2006.01) |

(52) U.S. Cl.
CPC . *F16L 59/07* (2013.01); *F16L 9/18* (2013.01); *F16L 59/143* (2013.01)

(58) Field of Classification Search
CPC ............ F16L 59/07; F16L 59/143; F16L 9/18
USPC ........ 138/114–117, 148, 149, 38; 165/104.26
See application file for complete search history.

(56) References Cited

U.S. PATENT DOCUMENTS

| | | | | |
|---|---|---|---|---|
| 3,889,715 | A * | 6/1975 | Lilja et al. ...................... | 138/117 |
| 3,901,311 | A * | 8/1975 | Kosson et al. ............ | 165/104.26 |
| 4,765,396 | A * | 8/1988 | Seidenberg ............... | 165/104.26 |
| 4,883,116 | A * | 11/1989 | Seidenberg et al. ..... | 165/104.26 |
| 4,906,496 | A * | 3/1990 | Hosono et al. ............... | 428/36.9 |
| 6,246,820 | B1 * | 6/2001 | Le Cam et al. ............... | 385/100 |
| 2007/0251674 | A1 * | 11/2007 | Bhatti et al. ............. | 165/104.26 |
| 2008/0223471 | A1 * | 9/2008 | Guo ............................. | 138/113 |
| 2011/0041934 | A1 * | 2/2011 | Holler ....................... | 137/561 R |

* cited by examiner

*Primary Examiner* — Patrick F Brinson
(74) *Attorney, Agent, or Firm* — Matthias Scholl P.C.; Matthias Scholl

(57) ABSTRACT

A pipe having variable cross section and including a working core pipe, capillary pipes or sheets, an outer pipe, a connection support, and a cavity. The capillary pipes or sheets are attached to an external surface of the working core pipe. The connection support connects the working core pipe and the outer pipe. The cavity is formed between the working core pipe and the outer pipe and has variable cross section.

18 Claims, 6 Drawing Sheets

PIPE HAVING VARIABLE CROSS SECTION

CROSS-REFERENCE TO RELATED APPLICATIONS

This application is a continuation-in-part of International Patent Application No. PCT/CN2010/080490 with an international filing date of Dec. 30, 2010, designating the United States, now pending, and further claims priority benefits to Chinese Patent Application No. 201010103596.X filed Jan. 27, 2010, to Chinese Patent Application No. 201010103591.7 filed Jan. 27, 2010, to Chinese Patent Application No. 201010103624.8 filed Jan. 27, 2010, and to Chinese Patent Application No. 201010103632.2 filed Jan. 27, 2010. The contents of all of the aforementioned applications, including any intervening amendments thereto, are incorporated herein by reference.

BACKGROUND OF THE INVENTION

1. Field of the Invention

The invention relates to a pipe having variable cross section that is used to convey hot/cold flow medium.

2. Description of the Related Art

Conventional outdoor pipe networks of a centralized heating and cooling system consist of underground pipes including either polyurethane insulation layers or compound insulation layers, with advantages of cost-efficiency, ease of construction, short construction period, slight amount of maintenance and heat loss etc. Such pipe networks, however, cannot withstand steam with a temperature high as 150° C. or above that is probably liable to carbonate the polyurethane insulation layer, thus compromising its service life and insulation capability. As for the compound insulation layers, although a layer of high-temperature resistant paint is coated between the pipe and its polyurethane insulation layer, the aging and carbonation of polyurethane is mitigated to certain extent but the problem cannot be root out. In addition, this solution is not applicable to the indoor pipe networks of a centralized heating and cooling system.

For indoor pipe networks of a centralized heating and cooling system, glass fiber reinforced plastic, aluminum alloy, or stainless steel sheets are usually adopted to fabricate square tubes which are subsequently coated with insulation and protection layers and change its diameter or cross section in line with the flow-rate of any hot/cold flow medium passing through. As such a solution needs a great deal of space for installation, it is compulsory to raise the height of a room, thereby increasing the construction cost considerably and impairing its interior beauty seriously.

SUMMARY OF THE INVENTION

In view of the above-described problems, it is one objective of the invention to provide a pipe having variable cross section for conveying of hot/cold flow medium. Possessing outstanding insulation capability, such a pipe is not only suitable for supplying hot flow medium like high temperature steam and liquid etc. but also for cold flow medium such as cold gas etc. On the other hand, the pipe having variable cross section can either be buried underground outdoors or configured indoors, especially for indoor configuration in a hidden fashion.

To achieve the above objective, in accordance with one embodiment of the invention, there is provided a pipe having variable cross section comprising a working core pipe, capillary pipes or sheets, an outer pipe, a connection support, and a cavity, wherein the capillary pipes or sheets are attached to an external surface of the working core pipe, the connection support connects the working core pipe and the outer pipe, and the cavity is formed between the working core pipe and the outer pipe and has variable cross section.

The energy of the hot/cold flow medium inside the working core pipe is tuned according to the density and size of the capillary pipes or sheets, thus adjusting the temperature of the cavity. Energy is stored in the cavity whose cross section can be changed so as to facilitate heating up or cooling down different rooms and households as well as various indoor and outdoor destinations during diverse time lengths. The cavity safeguards the operation temperature of the hot/cold flow medium inside the working core pipe and at the same time, prevents the internal insulation layer of the outer pipe from being aged or carbonated if such a layer is in direct contact with the cold/hot flow medium.

In a class of this embodiment, the working core pipe changes its diameter from large to small or vice verse along the flow direction of the hot/cold medium. When carrying hot flow medium, the working core pipe drops its pressure as the number of branches gradually increases and so it radically contracts to automatically compensate insufficient pressure and meanwhile, when carrying cold flow medium, it radically expands to make the entire conveyance process much easier.

In a class of this embodiment, the working core pipe is made of metal, plastic, or a combination thereof. Metal pipes are durable and conducts heat well, plastic pipes resistant to acid and alkali and cost-efficient and those made out of a combination thereof, for example, steel pipe internally or externally coated with plastic, have their own strengths and shortcomings.

In a class of this embodiment, the capillary pipes or sheets are made of metal pipe, metal sheet, plastic pipe, plastic sheet, or a combination thereof. The metal material is better than the plastic material in terms of heat/cold radiation. However, when pure plastic components are required in some special situations, the plastic pipe and sheet can be adopted to radiate heat/cold.

In a class of this embodiment, the density and size of the capillary pipes or sheets can be adjusted in line with the cold/heat amount and is also in relation to distance of transportation and pressure. The average cross section variation is determined and influenced by the density and size of the capillary pipes or sheets and therefore, the pipe having variable cross section used to convey heat/cold flow medium mentioned herein still can adjust its cross section even if its outer pipe's cross section remains unchanged.

In a class of this embodiment, the outer pipe comprises an internal insulation layer, a pipe body, and an external protection layer.

In a class of this embodiment, the internal insulation layer is made of super-fine glass layer, foamed polyurethane, mineral wool, or glass fiber, and the external protection layer is made of polyurethane elastic paint, ramie-cotton asphalt, or glass fiber.

In a class of this embodiment, the pipe body is made of metal, plastic, glass fiber reinforced plastic, and concrete mortar toughened via glass fiber or steel wire mesh.

In a class of this embodiment, the cross section of the outer pipe is square, circle, ellipse, half-circle, polygon, and others in shape. Square and circle are commonly used, ellipse and polygon for special occasions and half-circle is employed when 2 pipelines are constructed together or one pipeline but for dual-supply.

In a class of this embodiment, the circumferential area of the outer pipe stays the same rather than fluctuating with the hot/cold flow medium. Whether the internal cross section changes or not, the pipe manages to keep its external cross section identical at all times, which facilitates production and hidden installation and even industrialization of centralized heating and cooling.

In conclusion, the pipe having variable cross section used to convey hot/cold flow medium mentioned herein is applicable to outdoor pipe networks and open-and-hidden-installed indoor pipe networks of a heating and cooling system.

DETAILED DESCRIPTION OF THE EMBODIMENTS

For further illustrating the invention, experiments detailing a pipe having variable cross section for conveying of hot/cold flow medium are described below. It should be noted that the following examples are intended to describe and not to limit the invention.

Figure 1:
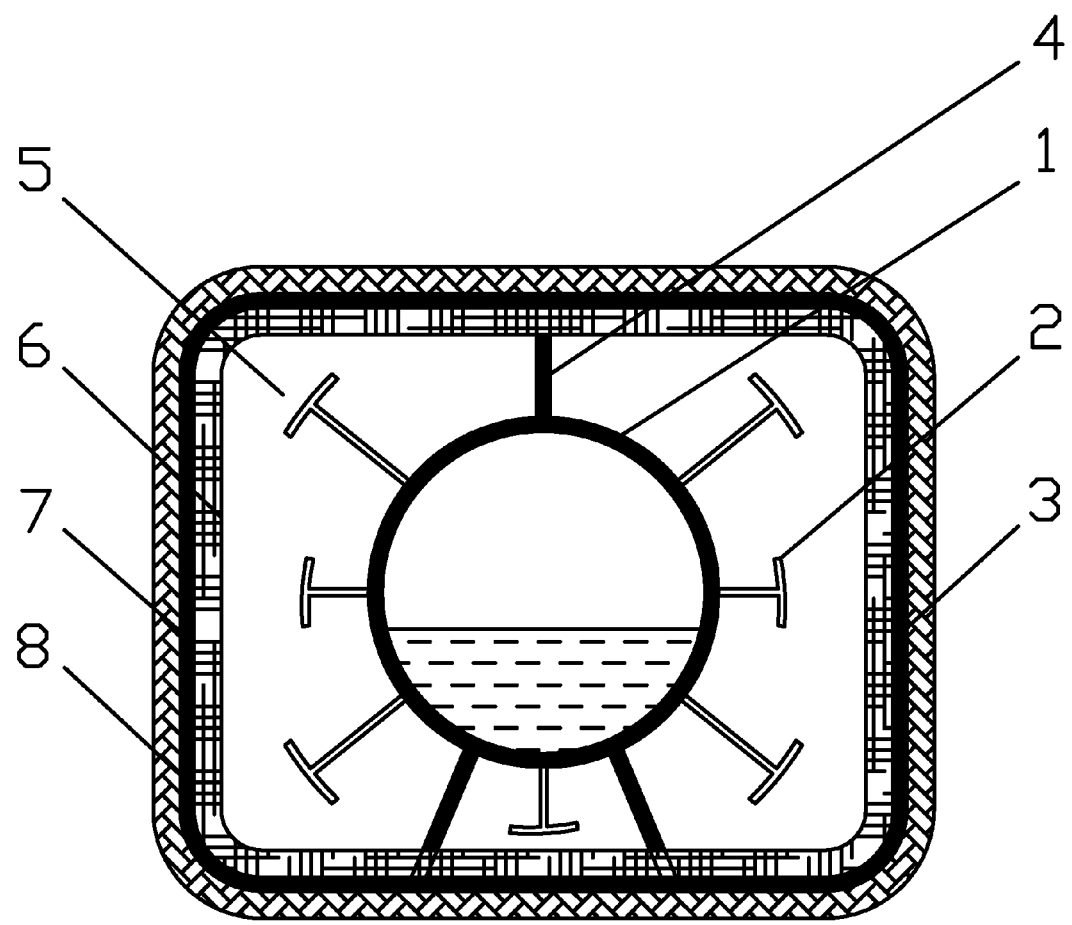
FIG. 1 is a cross section view of a pipe having variable cross section used to convey hot/cold flow medium in accordance with one embodiment of the invention.

FIG. 1 depicts the cross section of a pipe having variable cross section for conveying of hot/cold flow medium. The pipe comprises a working core pipe 1 through which a hot/cold flow medium flows, capillary pipes or sheets 2 attached to the external surface of the working core pipe 1, an outer pipe 3 comprising an internal insulation layer 6, a pipe body 7, and an external protection layer 8, a connection support 4 between the working core pipe 1 and the outer pipe 3, and a cavity 5 formed between the working core pipe 1 and the outer pipe 3 and having variable cross section.

The capillary pipes or sheets 2 disperse the hot/cold energy inside the working core pipe 1 to the cavity 5 which changes its temperature in accordance with the density and size of the capillary pipes or sheets 2. The cross section of the cavity 5 changes along with the density and size of the capillary pipes or sheets 2.

Figure 2:
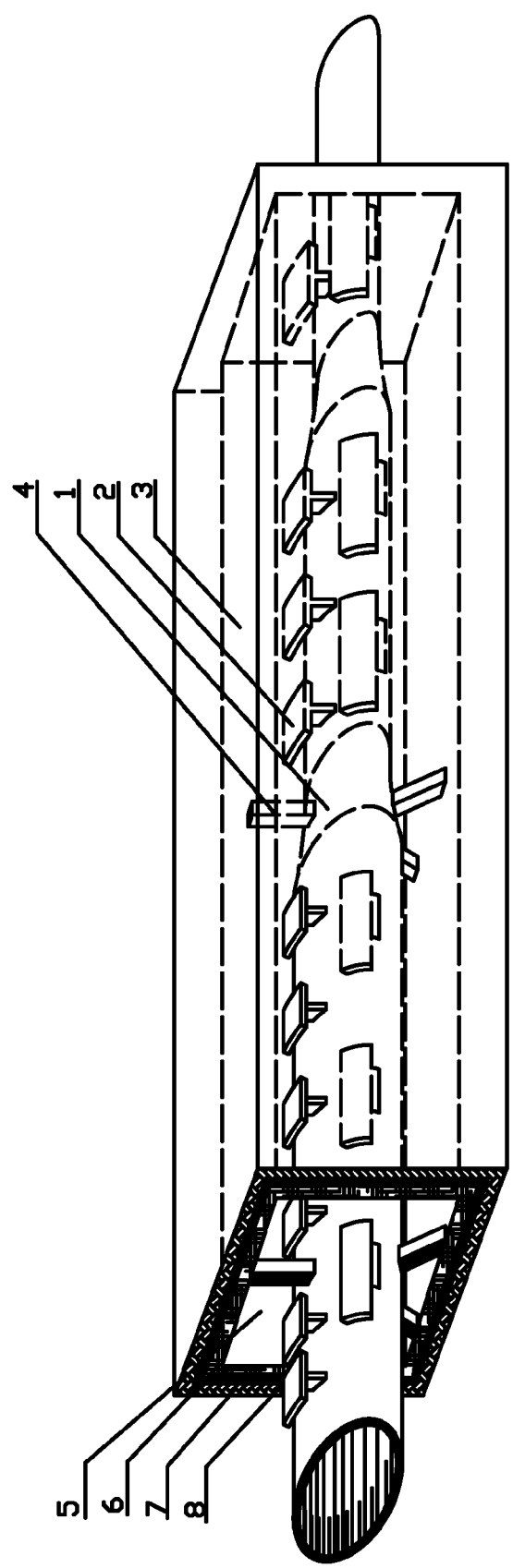
FIG. 2 shows a working core pipe with contracting diameter along the flow direction of hot/cold flow medium in accordance with one embodiment of the invention.

FIG. 2 shows the working core pipe 1 contracts its diameter along the flow direction of the hot/cold flow medium. As the working core pipe 1 extends, i.e., the much further away from the hot/cold source is, the faster the energy attenuates, and the available hot/cold energy also decreases. Thus, it is necessary to cut down the diameter of the working core pipe 1 in order to transport hot/cold flow medium and conserve energy more efficiently. As the cross section of the working core pipe 1 decreases and moreover, the outer pipe 3 remains its cross section unchanged, the cross section of the cavity 5 accordingly increases, thus amplifying the temperature difference between the cavity 5 and working core pipe 1. Energy conservation is failed in this manner To address such a setback, the capillary pipes or sheets 2 are arranged on the external surface of the working core pipe 1 to extend the radiating area of the working core pipe so that the energy inside the working core pipe 1 can disperse and transfer much better, ultimately making the temperature of the cavity 5 close to that of the working core pipe 1 and assisting to protect the energy inside the cavity 5 and stabilize the temperature.

Figure 3:
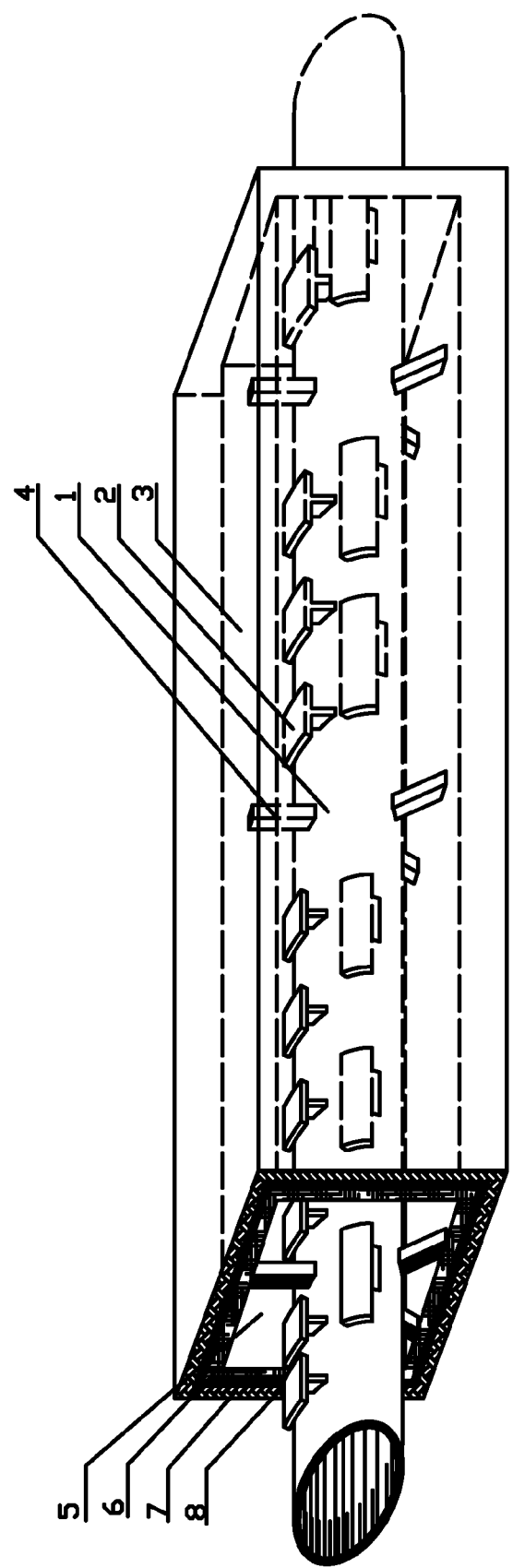
FIG. 3 shows a working core pipe with constant diameter in accordance with one embodiment of the invention.

FIG. 3 shows the working core pipe 1 whose diameter remains unchanged instead of fluctuating with the flow of the hot/cold flow medium The diameter of the working core pipe 1 does not change at all, but the density and size of the capillary pipes or sheets 2 on the external surface of the working core pipe 1 adjust as needed, and the cross section of the outer pipe 3 also keeps the same. The kind of pipe having variable cross section that can be employed to transfer hot/cold flow medium is easy to manufacture, installed in a hidden fashion, and also suitable for various occasions.

Figure 4:
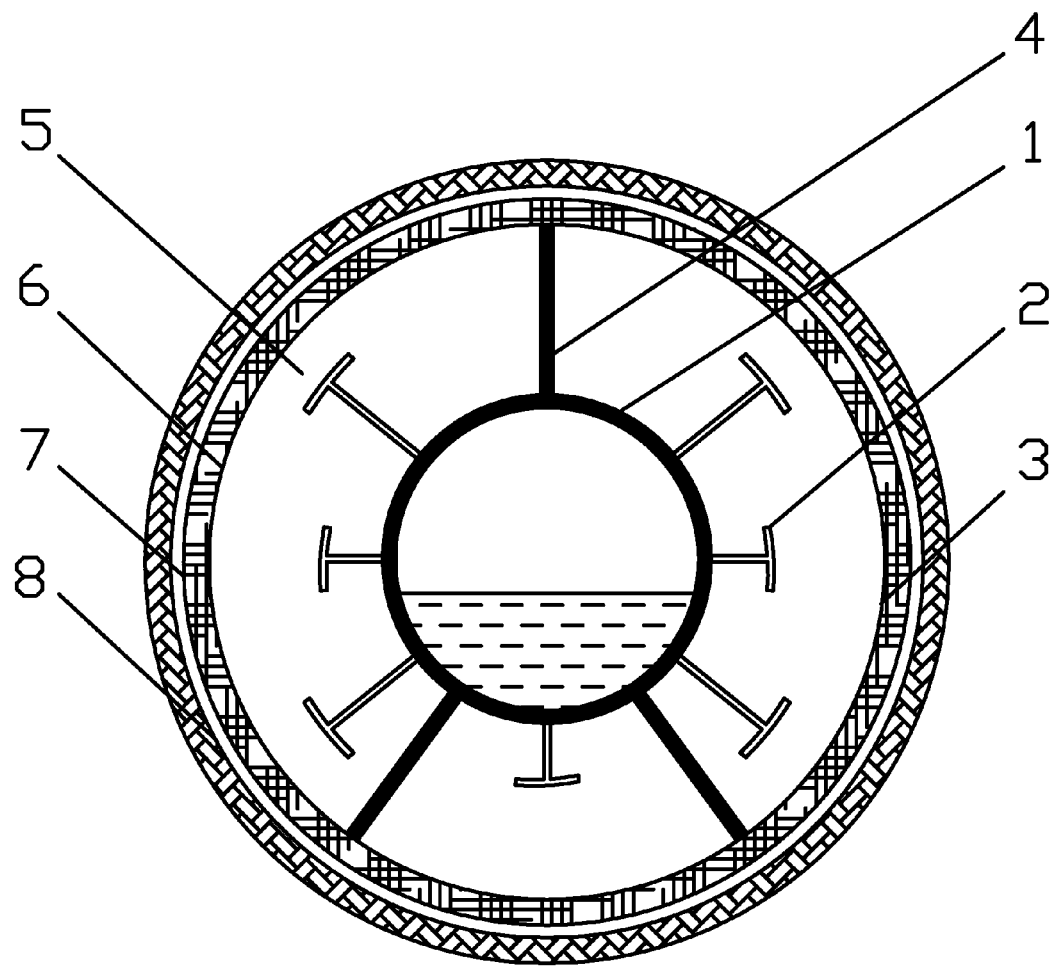
FIG. 4 shows an outer pipe in the shape of circle in accordance with one embodiment of the invention.
Figure 5:
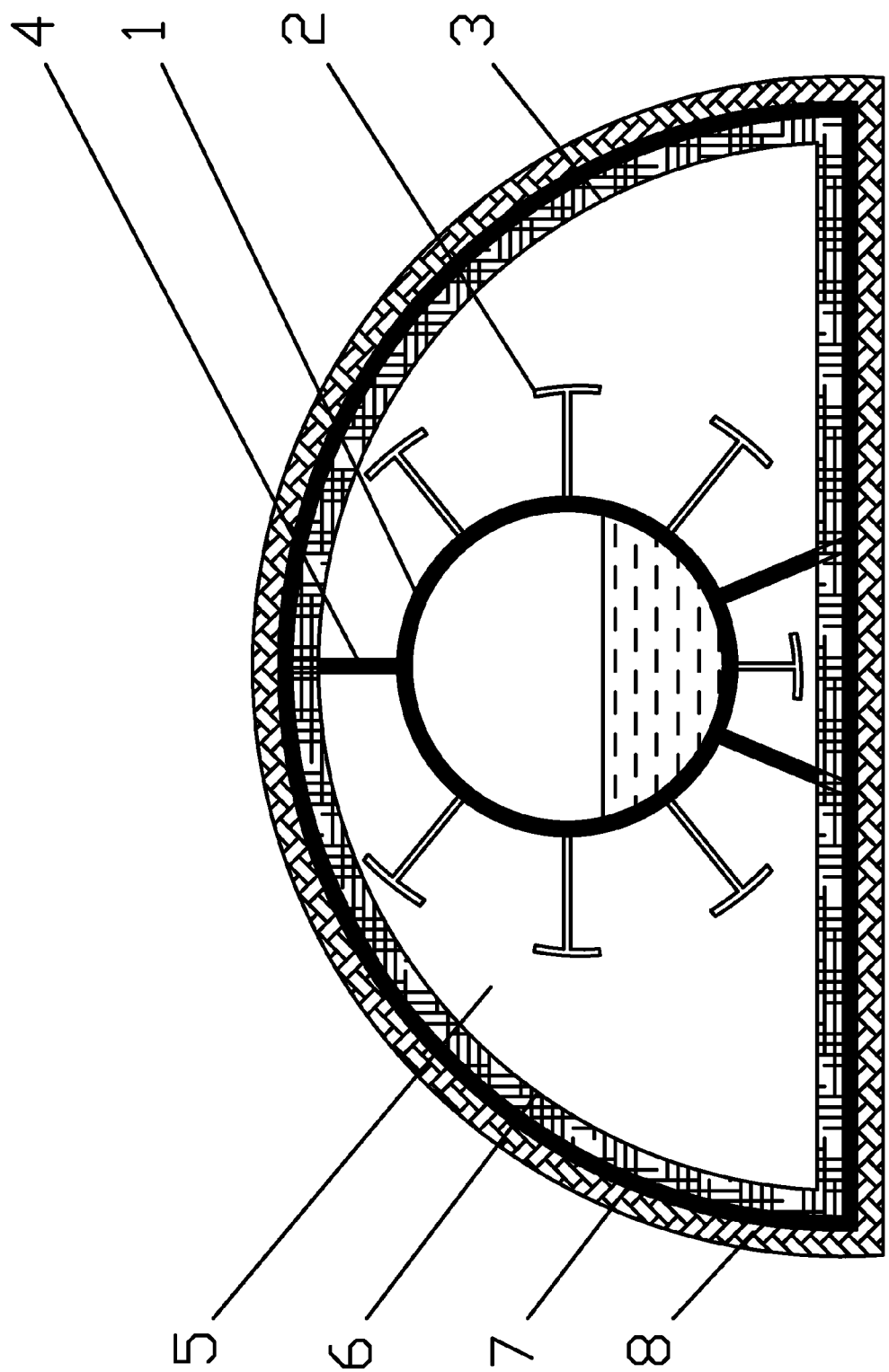
FIG. 5 shows an outer pipe in the shape of half-circle in accordance with one embodiment of the invention.

FIGS. 4 and 5 respectively show the examples of the outer pipe 3 in the form of circle and half-circle. The outer pipe 3 in the shape of circle or half-circle reaches its optimum in terms of hot/cold flow medium conveyance and energy consumption. Unfortunately, the kind of pipe is difficult to mount indoors either in an open or concealed manner. Except for outdoor use, the outer pipe 3 in the abovementioned shape is only suitable for special occasions.

Figure 6:
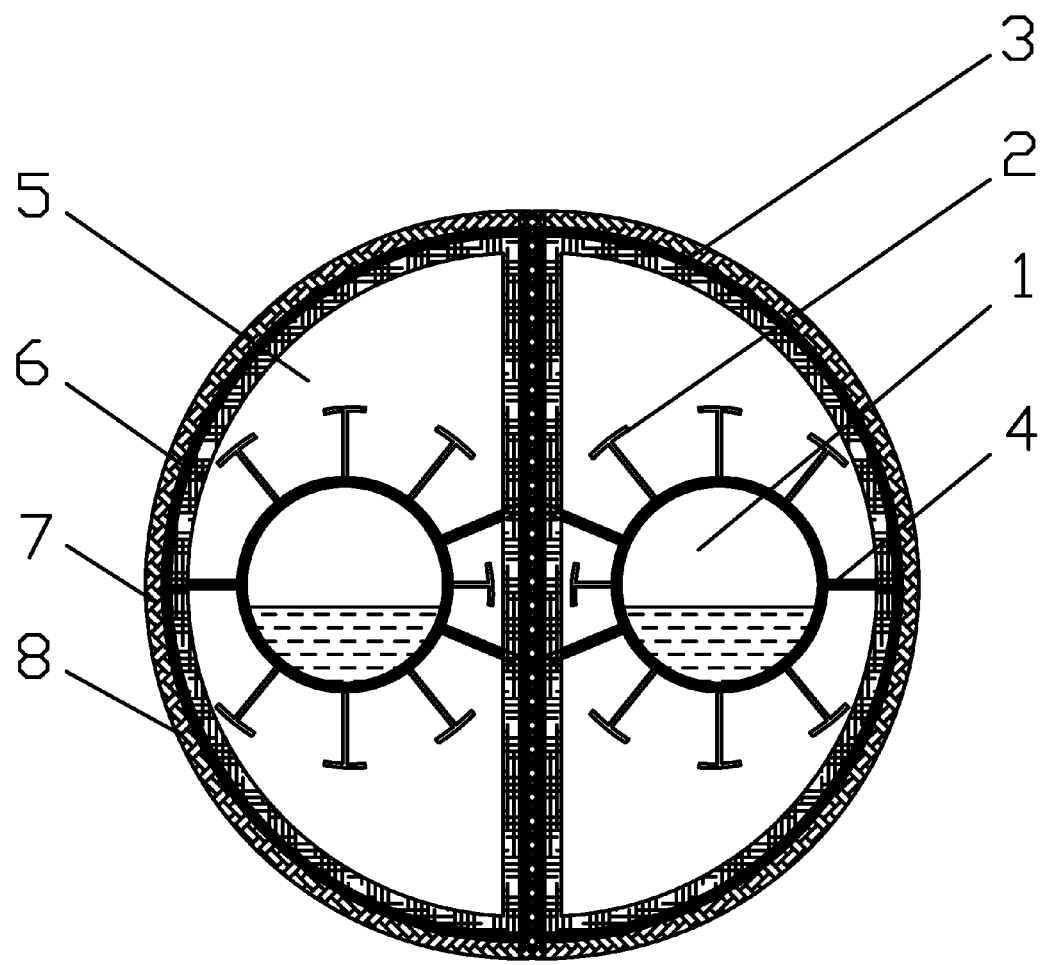
FIG. 6 shows an outer pipe in the shape of 2 combined half-circles in accordance with one embodiment of the invention.

FIG. 6 shows an example of the outer pipe 3 in the shape of 2 combined half-circles. The half-circle outer pipe 3 is especially applicable to mixed installation of heating and cooling pipes in the single-pipeline and dual-supply system.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A pipe having variable cross section, comprising:
   a) a working core pipe;
   b) capillary pipes or sheets;
   c) an outer pipe;
   d) a connection support; and
   e) a cavity;
   wherein
   the capillary pipes or sheets are attached to an external surface of the working core pipe;
   the connection support connects the working core pipe and the outer pipe; and
   the cavity is formed between the working core pipe and the outer pipe and has variable cross section.

2. The pipe of claim 1, wherein the working core pipe changes its diameter from large to small or vice verse along a flow direction of a hot/cold medium therein.

3. The pipe of claim 1, wherein a diameter of the working core pipe is unchanged.

4. The pipe of claim 2, wherein the working core pipe is made of metal, plastic, or a combination thereof.

5. The pipe of claim 3, wherein the working core pipe is made of metal, plastic, or a combination thereof.

6. The pipe of claim 1, wherein the capillary pipes or sheets are made of metal pipe, metal sheet, plastic pipe, plastic sheet, or a combination thereof.

7. The pipe of claim 1, wherein a density and size of the capillary pipes or sheets is changeable.

8. The pipe of claim 1, wherein the outer pipe comprises an internal insulation layer, a pipe body, and an external protection layer.

9. The pipe of claim 8, wherein the internal insulation layer is made of super-fine glass layer, foamed polyurethane, mineral wool, or glass fiber.

10. The pipe of claim 8, wherein the external protection layer is made of polyurethane elastic paint, ramie-cotton asphalt, or glass fiber.

11. The pipe of claim 8, wherein the pipe body is made of metal, plastic, glass fiber reinforced plastic, and concrete mortar toughened with glass fiber or steel wire mesh.

12. The pipe of claim 1, wherein a cross section of the outer pipe is square, circle, ellipse, half-circle, polygon in shape.

13. The pipe of claim 1, wherein a circumferential area of the outer pipe stays the same.

14. A method for establishing an outdoor pipe network or an open or hidden-installed indoor pipe network of a heating and cooling system comprising forming said network from the pipe of claim 1.

15. The method of claim 14, wherein the working core pipe changes its diameter from large to small or vice verse along a flow direction of a hot/cold medium therein.

16. The method of claim 14, wherein a diameter of the working core pipe is unchanged.

17. The method of claim 14, wherein a density and size of the capillary pipes or sheets is changeable.

18. The method of claim 14, wherein the outer pipe comprises an internal insulation layer, a pipe body, and an external protection layer.

\* \* \* \* \*